G. H. THOMAS.
ATTACHMENT FOR ADDING OR CALCULATING MACHINES.
APPLICATION FILED NOV. 9, 1912.

1,246,186.

Patented Nov. 13, 1917.
3 SHEETS—SHEET 1.

INVENTOR
George H. Thomas

WITNESSES

BY
Wm Steell Jackson
ATTORNEY

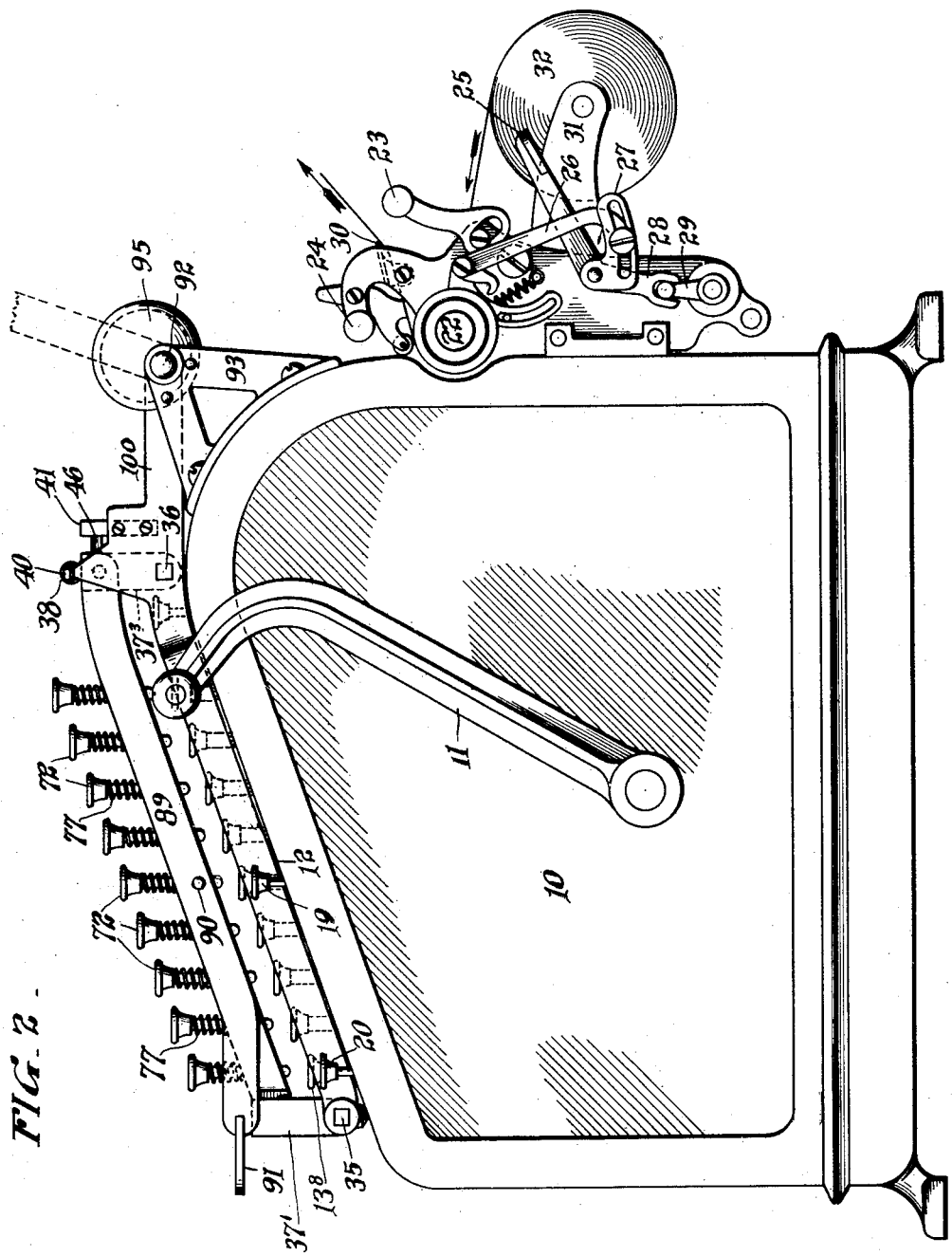

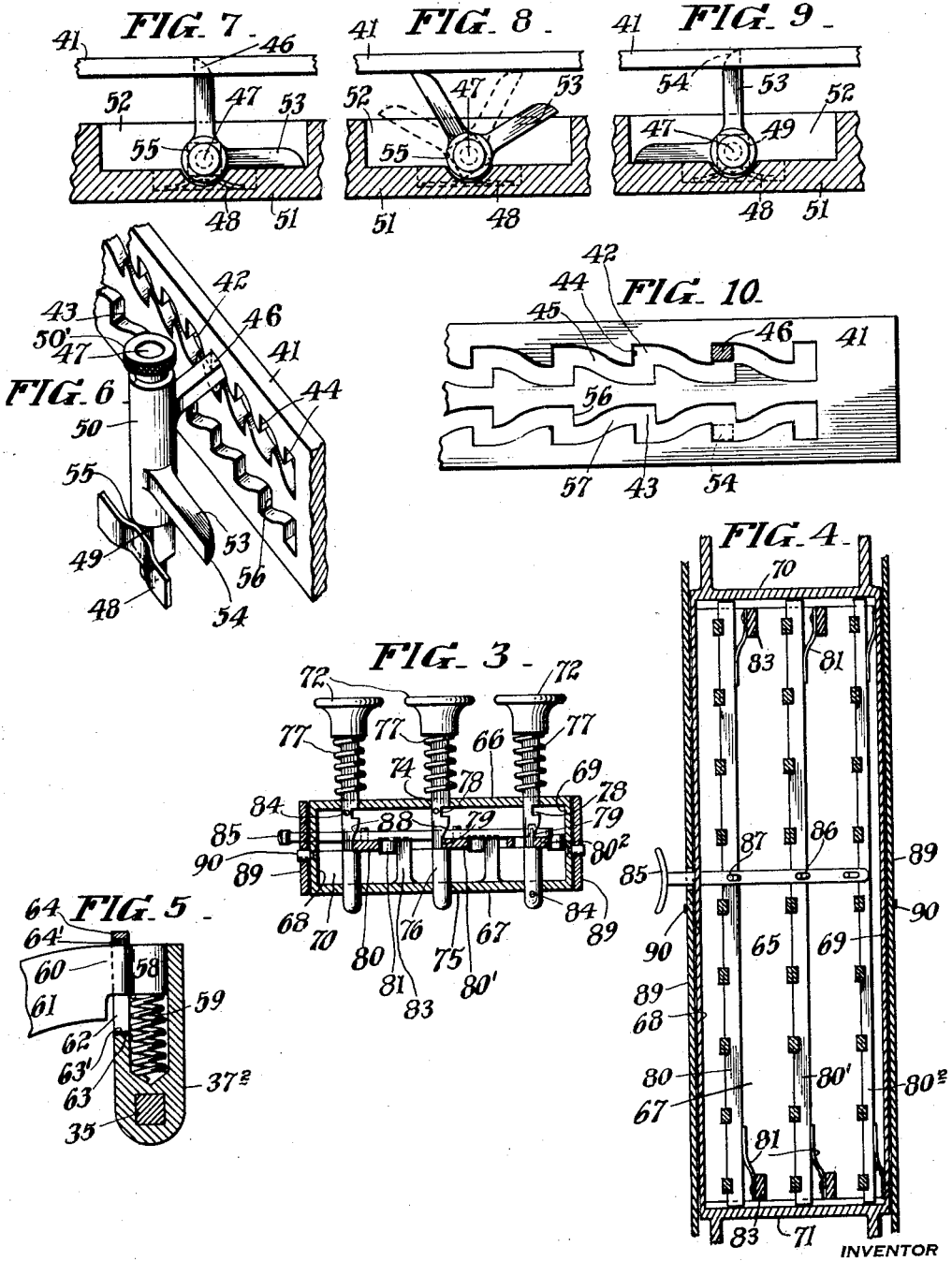

UNITED STATES PATENT OFFICE.

GEORGE H. THOMAS, OF MILLVILLE, NEW JERSEY.

ATTACHMENT FOR ADDING OR CALCULATING MACHINES.

1,246,186.   Specification of Letters Patent.   Patented Nov. 13, 1917.

Application filed November 9, 1912. Serial No. 730,308.

*To all whom it may concern:*

Be it known that I, GEORGE H. THOMAS, a citizen of the United States, residing at 148 S. 2nd Street, Milleville, in the county of Cumberland and State of New Jersey, have invented a certain new and useful Attachment for Adding or Calculating Machines, of which the following is a specification.

The purpose of my invention is to control the keys of a main keyboard of a calculating machine by a supplemental keyboard for certain operations.

A further purpose of my invention is to set several keys of an adding or other calculating machine as a unit through master keys similarly set and to space the master keys laterally in either direction and impress successive laterally spaced identical groups of keys in the main keyboard.

A further purpose of my invention is to reduce opportunity for error in the digits themselves and in their columnar relation in numbers which are to be successively repeated in different columns in a calculating machine keyboard.

A further purpose of my invention is to provide an auxiliary keyboard for an adding machine with automatic spacing mechanism capable of operation in either direction at will.

A further purpose of my invention is to provide a master key-board with mounting, permitting it to be thrown out of the way of the main keyboard or any place thereover, without disturbing its lateral adjustment with respect to the main board.

A further purpose of my invention is to provide a "floating" auxiliary keyboard superimposed above and movable upon lateral guides across a main calculating machine keyboard and mechanism whereby the setting of the auxiliary keyboard may be transferred to the main keyboard depressing corresponding keys in the main keyboard in the same relation and in any columnar relation.

A further purpose of my invention is to present a process of setting the keys of an adding machine for successive steps in the division or multiplication by addition whereby the sequence of digits to be added is selected and set separate from the main keyboard and is successively impressed upon the main keyboard in different lateral positions representing the setting of the main keyboard for multiplication by the several numerals of the multiplier, securing speed and insuring accuracy.

Further purposes of my invention will appear in the claims and specification hereof.

I have preferred to illustrate my invention by but one form thereof, which is at the same time simple, effective and relatively inexpensive, and which illustrates the principles involved without excessive complication by the number of elements involved.

Fig. 2 is a side elevation of the form of my invention shown in Fig. 1.

Fig. 3 is a transverse section through my attachment taken upon the line 3—3 of Fig. 1.

Fig. 4 is a longitudinal section of a portion of my adding attachment taken upon line 4—4 of Fig. 3.

Fig. 5 is a broken cross section of a portion of the structure seen in Fig. 2.

Fig. 6 is a perspective view of a spacer and ratchet used by me.

Fig. 7 is a section corresponding to line 7—7 of Fig. 6.

Figs. 8, 9 and 10 are cross sectional views of the pawl and ratchet illustrated by me, shown in different positions.

Similar numerals of reference indicate like parts in the drawings.

Figure 1:
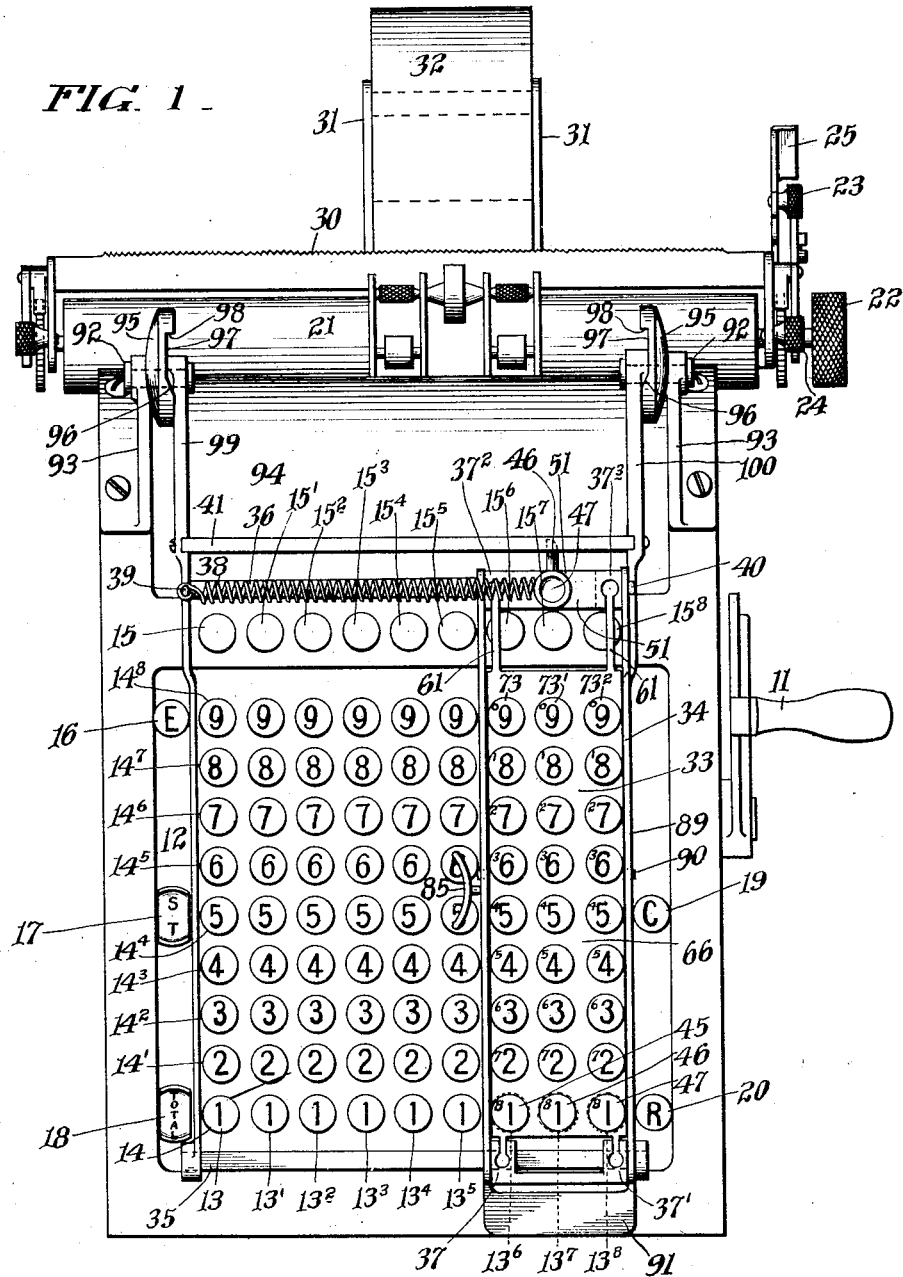
Figure 1 is a top plan view of an adding machine of one of the Burroughs types to which my invention has been applied.

While I have chosen to illustrate my invention in connection with adding machines and have selected a Burroughs adding machine, I recognize that this is illustrative merely and that my attachment, though finding its greatest usefulness in adding machines is suitable for use in other calculating machines and in a considerable number of different adding machines within the spirit and scope of my invention. For convenience I shall describe my invention as applied to the structure of the Burroughs machine, thus complying with the requirement that I shall disclose one operative construction.

The machine illustrated is so well known that I shall refer to its recognized parts but briefly and have intended that their illustration shall be conventional.

I have shown the frame 10, operating lever 11 and keyboard 12 (conventionally) and for convenience in further reference will designate the rows of keys running in vertical lines lengthwise of the sheet and numbered from 1 to 9 by reference characters 13, 13', $13^2$, $13^3$, $13^4$, $13^5$, $13^6$, $13^7$ and $13^8$. Likewise, for convenience in further reference and dividing these same rows along lines parallel with the bottom of the drawing, I will number these for reference purposes by the characters 14 to $14^8$.

I have numbered the separate column correction buttons 15 to $15^8$ and have shown elimination button 16, sub total button 17, total button 18, correction button 19 and repeat button 20 merely for the purpose of showing the usual adjuncts to one of these adding machines.

I have preferred to apply my invention to a machine, of which there are various ones upon the market, in which when one of the keys of any column $13-13^8$ has been depressed or set, no other key can be depressed in that column until the first key has been released.

I have likewise illustrated conventionally certain parts of the printing and paper handling mechanism, among other items the platen 21, platen knob 22, pressure roll lever 23, lifter 24, stop bar release 25, connecting link and levers 26, 27, 28 and 29, paper cutter 30, paper roll bracket 31 and tape 32. These relate to the recording mechanism by which the numbers added are impressed upon the tape 32 and have nothing whatever to do with my attachment. I have, however, mounted my attachment to permit full access to this adjunct of the adding machine, whether my attachment is in position for use, or thrown out of position, as in disuse.

As is well known to all users of adding machines, multiplication can be performed on these machines by successive additions of the multiplicand a number of times corresponding to the numeral at the extreme right of the multiplier, then of the multiplicand, set up in the same order with each of its digits in the column to the left of that in which it was previously set up (corresponding to ten times the multiplicand) adding it a number of times corresponding to the next to the right hand number of the multiplier and so on successively adding the group of figures comprising the multiplicand or a tens product thereof a number of sets of times corresponding to the number of numerals in the multiplier.

As is likewise well-known, the operation of division can and frequently is performed upon an adding machine, after setting the dividend up in the machine, by the successive addition of the complements of the numbers in the divisor, to the dividend beginning at the left and progressing to the right whenever the remainder shown is less than the dividend, adding the complements in each case as many times as permissible and spacing the quotient at the left by the uniform use of a 9 at the left of the divisor's complement.

In either event, the successive depressions of the same number be it multiplicand or complement of the divisor, is called for in each of several different columnar positions corresponding to the number of figures in the multiplier or quotient. The repetitions of the same number in each columnar position of the group is taken care of by the use of the repeat button. These successive settings in different columns involve a great deal of time in the aggregate where the number of operations is large, or where there are many figures in the multiplier or quotient and give opportunity for error with each setting. My invention is intended to set the same group of digits in different columnar position by a single operation which is purely mechanical and which correspondingly saves time and reduces opportunity for error.

For this purpose I have provided a master keyboard 33, which I use also as a carriage, in whose keys the group to be added is depressed or set.

The master keyboard is supported by a frame which, as shown hereinafter, may be thrown into or out of position readily by any suitable construction. I have preferred not to move the frame itself laterally to bring the keys to their respective lateral positions, and so have illustrated the frame 34 as itself providing guides for this lateral movement of a keyboard carriage, conventional guides being shown at 35 and 36 upon which any suitable form of carriage is supported by posts or blocks $37-37^3$. The carriage may be drawn along bars 35 and 36 in either direction by any suitable tension, here illustrated by spring 38, attached at one end to the carriage and which can be attached at its other end to either side of the machine, as at 39 or 40 to cause movement in the direction of the attaching pin. It is shown as attached at the left, providing for spacing from right to left, as for multiplication.

In order to insure the proper spacing of the carriage with each depression, I have provided one form of spacer among many which could be applied to accomplish the results. In the form illustrated I use a ratchet plate 41 having two reversely located ratchet tracks or grooves 42 and 43, the ratchet track 42 being intended for use in case of multiplication and the ratchet track 43 being arranged for use in case of division, controlling spacing to the left and right respectively after each depression, and permitting movement step by step, for a distance at each step corresponding to the distance between vertical rows of keys of the main keyboard. In the track 42 the abrupt faces 44 at the left are effective as stops and the guiding passages 45 lead a pawl 46, released from one stop by downward movement of the pawl, into contact with the next. The plate 41 is supported upon frame 34 and is preferably rigid in it. The pawl is carried by carriage 33 forming the end of an arm 46. I have shown this arm as capable of resilient movement in a counter clockwise direction about the axis 47 under the restraint of any suitable spring, as 48, pressing against a flattened part 49 upon spindle 50 (see Fig. 6) but as incapable of movement in a clockwise direction beyond the position there shown. Spindle 50 may be mounted in any desired bearings. The result is that, with each depression of the frame, the pawl will be moved far enough to be released from one of the engaging edges or faces 44 and the carriage will be drawn by the tensional (here spiral) spring 38 to the left until the pawl engages with another corresponding face 44, resulting in spacing the carriage a distance corresponding to the distance between adjoining vertical rows of main keyboard keys 13—13⁸.

The spindle 50 is mounted within bar 51, transverse to the carriage and here shown as forming the end of the supplemental or master keyboard carriage and uniting or carrying the blocks 37² and 37³. It is turned by knurled head 50'. The blocks 37 and 37' are also preferably joined to reduce side strain. The spindle preferably passes into a pocket 52 best seen in Figs. 7, 8 and 9; and I have shown the position corresponding to that of Fig. 6 in Fig. 7. In this manner successive spacings will take place to the left until the desired limit of movement has been reached, when the carrier may be drawn by hand back to its zero point or to any point of intended use. The pawl acts against successive faces 44 as against a ratchet under the resilient action of the spring 48 snapping into successive "notches" with left hand travel of the carriage.

The spindle 50 preferably carries a second arm 53, presenting a second nose 54, approximately ninety degrees from the first as shown, and the spindle is correspondingly flattened as at 55 approximately at right angles with the first flattened position for engagement with the same spring 48, tending to turn the pawl 54 to the position seen in Fig. 9 from that shown dotted in Fig. 8. In this dotted position the nose 54 is rubbing along the outside of the plate between openings in the second track 43 which is a reversal of track 42 and presents abrupt faces 56 and intermediate guiding passages 57. The faces 56 stop against movement in a direction opposite to that of faces 44.

When the spindle is turned more than 45° from the position seen in Figs. 6 and 7 to some such position as shown in dotted lines in Fig. 8 to change the direction of the step-by-step movement, the pawl 54 becomes effective by reason of the second flat 55 engaging spring 48 and at first opportunity the nose 54 will snap into the track 43, reaching a position shown in Fig. 9 and successively engaging the faces 56. When the spindle is so turned the tensional (spiral) spring should be reversed. The movement and operation of the second pawl in track 43 will be similar to that of the first pawl in track 42 but the carriage will move in a reverse direction.

In the form illustrated the carriage 33 is supported from the frame 34 through the guide blocks resiliently by means of heads 58 resting upon springs 59 and connected by necks 60 with the arms 61 of the carriage so as to permit the depression of the carriage.

The necks pass through slots 62 in the blocks. Movement of the necks downwardly is stopped by their engagement with the edges 63, preferably cushioned at 63', which comprise stops, and excessive upward movement is stopped by any suitable buffers or stops 64 preferably cushioned as at 64'.

In this manner the carriage for the master keys, here itself shown as the master keyboard, is given lateral step by step movement and vertical movement; the vertical movement is made equal throughout the board when full stroke has been had, and the vertical movement releases the latch to permit lateral spacing under the tension of the spring 38.

Since I prefer to place the master keys in the carriage 33, making it thus a master keyboard, I have provided guides, support and controlling mechanism for the keys upon or within this carriage, illustrating in this, as in all of the structure by which my invention is illustrated, merely one way of accomplishing the result among the many which will be evident to those skilled in the art after seeing my disclosure.

In the form illustrated I interrupt the arms 61 to form a casing 65 in the central portion of the carriage, showing top and bottom walls 66, 67, side walls 68, 69 and end walls 70, 71 supported from or upon the arms 61 and joined to each other in any suitable manner.

I have illustrated but three rows vertically of keys 72 in the master keyboard, numbering these 73, 73' and 73². Obviously any number of rows of these keys could be used, operating in the same way and to the same effect. The three rows selected are sufficient to illustrate the principle without undue complication. These keys are guided in the top and bottom of the casing, as at 74, 75, and at one of these points the key and guide are preferably non-circular to prevent rotation of the key spindle 76.

I have shown conventional springs 77 bearing upon the top of the casing at one end and against the tops of the keys at the other end as a conventional means of resetting these keys when they have been depressed and subsequently released.

Each of the keys is illustrated as notched at 78 and 79 so as to be engaged by one of the bars 80, 80′, 80², each of which is preferably spring-pressed in any suitable manner, as by a spring 81 attached to the casing or to any post 83. The pins 84 provide a means for preventing disengagement of the keys from the casing which is supplemental to the notches 79 but which would in itself be effective.

By this arrangement the keys will be held up by the springs in the position shown in Fig. 3 and when downwardly pressed, will push the corresponding bar 80—80² out of the notch 79, where this is used, during the downward movement, until the notch 78 comes in line with the bar. The bar will enter the notch 78 and retain the key in depressed condition.

I have not felt it necessary to illustrate means for preventing two keys in a single column from being depressed, since ordinarily an error of this kind would be detected immediately by the fact that but one of the keys of the main keyboard could be depressed. Mechanisms for preventing depression of more than one key in a row are well known. Obviously, any suitable mechanism for this purpose could be applied to my master keyboard where this application became desirable.

I have shown a slide 85 for releasing the keys. It passes through the side 68 and is slotted at 86 in proximity to each bar 80—80² to receive pins 87. The bars can move without the slide, as will be the case in the setting or depressing of keys whether notch 79 is used or not, since the cam surfaces 88 will press the bars outwardly, moving the pins 87 within the slots 86. The slide affords one means of releasing the keys from retention by the bars in depressed position.

I have limited the vertical movement of the carriage at each end to that which is required, in order that the depressed keys 72 may be effective as a unit. If all of the depressed keys should be at one end of the casing and these should tilt the carriage slightly when they come in contact with the main keys or before they have fully depressed the main keys, I purpose that the opposite end of the carriage shall be stopped at 63′ before the depressing lever has taken its full stroke requiring that the "high" end of the carriage complete its full movement and depress the keys of the main keyboard. In order to assist in this operation and to permit the master keyboard to depress to the same extent throughout, I pivot the carriage to the depressing lever 89 at approximately the center of the carriage and casing, as seen at 90, having the lever 89 straddle the carriage to bring pressure upon the two sides of the carriage equally. I have pivoted the depressing lever in guide blocks 37², 37³ and terminate it at the other end in operating plate 91. It will be evident that, when plate 91 is pressed, those keys of the master keyboard which have been depressed will engage with and set those keys of the main adding machine keyboard which lie beneath them, while the keys within the master keyboard which have not been so set will have no effect upon the keys under them.

In order that my device may be quickly, easily and securely placed in superimposed position above the main keyboard, I have preferred to swing it about centers 92, in brackets 93, upon the back of the machine, leaving a space 94 between the pivot point and the machine sufficient so that, in the raised position of the frame shown in dotted lines in Fig. 2, this space below the operating mechanism shall be ample to permit access to the tape for examination and in order that it may be torn off against the cutting strip 30.

In order that my supporting frame 34 may be held in a position shown in dotted lines in Fig. 2, I have preferred not to depend upon gravity alone, notwithstanding that this would operate as soon as the vertical line through the pivot point was passed by the center of gravity of my attachment, but have provided a dished, pan-like spring 95 at each end, having a cam face 96 on each side and with the cams facing each other, providing a slight recess 97 and stop 98 in each face engaged by the arms 99 and 100, when in raised position, with the result that a slight pressure will be required to release these arms from their resting places within the recess and press the spring members 95 back.

Each of the springs is preferably supported from the bottom of its pan-like structure, eccentrically as shown, and in approximately the same line as the axis about which the frame 34 swings.

In operation the attachment is moved from its position when not in use to a position over the keyboard of the machine. The operating spring for lateral movement is placed so as to cause movement in the direction required, to the left or right, according to whether the intended operation be multiplication or division. The carriage is set laterally upon the board in the position required for the first intended use. The keys of the master keyboard are then depressed for the desired combination of digits.

Let us assume a multiplicand of 567.

These keys will be depressed in the columns 73, 73' and 73² respectively, above horizontal columns 14⁴, 14⁵ and 14⁶ respectively. Assuming that whole numbers are to be used throughout, and that the two columns 13⁷ and 13⁸ represent decimal places, the carriage would be moved two columns to the left from the position shown in Fig. 1.

Assuming now a multiplier of 983, the plate 91 would be depressed to cause the depression of the keys in the keyboard beneath it, the repeat button 20 would be set and the lever 11 moved three times. The carriage would mean time space one column to the left. When the repeat button was released and the main keyboard keys released either by the button 19 or the operation of the lever, if its last movement occurred after the release of the button 20, a second depression of the plate 91 would reset the same combination of figures in the main keyboard in positions one place to the left of their positions as previously depressed. The repeat button is now again set and the lever 11 is moved eight times, the keys of the main keyboard being reset as before. The master keyboard has mean time again spaced one column to the left and a third depression of the keyboard causes the combination of the multiplicand to be set up a third time, each digit one column to the left of the position in which it was last previously depressed. The repeat button is then set and the lever operated nine times, giving the result of the multiplication as the product 557361. The repeat button may be kept down all the time if desired.

So far as the operation of the master keyboard and its keys are concerned the example given will illustrate this sufficiently for its application to division by addition to be well understood by those familiar with the art. The pawl used in my construction as illustrated, will be different, using the position of the step-by-step controlling mechanism shown in Fig. 9, rather than that in Fig. 7 and the tension will be applied to movement in a right hand direction. The keys of the master keyboard would, of course, be released as by operation of slide 85 before each intended solution. I have shown the complements of the several numbers upon the keys of the master keyboard.

It will be evident that I have illustrated one form of superimposable master keyboard capable of automatically spacing in either direction with means for duplicating the setting of its keys in the main keyboard in any desired number of successively shifted lateral positions, and that a great variety of constructions is possible and permissible within the scope of my invention for accomplishing each of the mechanical steps involved in producing the above result.

Having thus described my invention what I claim as new and desire to secure by Letters Patent is:

1. In a device of the character stated, a master keyboard frame movable into and out of position over a keyboard and having guides, a master key-board movable on said guides having a plurality of keys with terminals free at their lower ends in combination with means for retaining the keys individually in depressed position, a pawl movable with the master key-board and a ratchet upon said master keyboard frame with whose stops the pawl is engageable in raised positions of the key-board and from which, one at a time, the pawl is released in the downward movement of the key-board.

2. In a device of the character stated, a main key-board having keys, a vertically and laterally movable auxiliary key-board, superimposed upon the main key-board and having its keys in register with those of the main key-board, a spring for maintaining the auxiliary key-board in raised position and a double escapement for the auxiliary key-board spacing it in either direction over adjoining rows of keys of the main key-board, with vertical movement of the auxiliary key-board.

3. In a device of the character stated, a master key-board frame, guides thereon, a master key-board laterally movable upon the guides, means for retaining the keys individually in depressed position, means for depressing the master key-board bodily, relatively fixed ratchets facing in opposite lateral directions, two pawls carried by the master key-board and engageable one at a time with each ratchet and reversible tension means for moving the master key-board in either direction laterally at will.

4. In a device of the character stated, a master key-board frame having laterally extending guides thereon, a master key-board yieldingly supported upon said guides and vertically and laterally movable with respect thereto and carrying keys, escapement mechanism controlling lateral movement of the key-board along the guides, tension means for moving the key-board laterally with each of its vertical movements in one direction, a depressing lever pivoted at its end in the frame and connected with the master key-board and means for retaining master key-board keys individually in depressed position.

5. In a device of the character stated, a main keyboard, a master keyboard frame adapted to be moved into and out of position over the main keyboard, guides upon the frame, a master keyboard movable upon the guides, spring means tending to move the master keyboard laterally upon the frame and pawl and ratchet mechanism, one carried by the master keyboard and the other by the frame for regulating lateral movement in accordance with vertical movement between the master keyboard and frame.

6. In a device of the character stated, a main key-board, a frame provided with guides, resilient supports movable along the guides, a master key-board resting upon said supports, a ratchet upon the frame, a pawl connected with the supports and adapted to engage the ratchet, tension means for moving the master key-board, means for retaining keys of the master key-board in depressed position and means for depressing the master key-board and causing the pawl to advance along the ratchet.

7. In a device of the character stated, a main key-board, a master key-board supporting and guiding frame, pivots for said frame providing a horizontal axis therefor, a master key-board guided by said frame, means for depressing the master key-board and means for resetting the master keyboard in a different position laterally by reason of its vertical movement when released from the said depression.

8. In a device of the character stated, a supporting and guiding frame, a master key-board movable thereover, means for depressing the master key-board bodily, a ratchet supported by the frame and a pawl movable with the master key-board and released from said ratchet by the bodily movement of the master key-board.

9. In a device of the character stated, a supporting and guiding frame, a master key-board movable thereover, means for depressing the master key-board bodily, a ratchet supported by the frame and a pawl movable with the master keyboard and released from said ratchet by the bodily movement of the master key-board.

10. In a device of the character stated, a supporting and guiding frame, a master keyboard resiliently supported thereon, a pair of facing ratchets upon the frame and a pair of pawls engageable therewith and freed therefrom by bodily movement of the master key-board.

11. In a device of the character stated, a supporting and guiding frame, a master keyboard resiliently supported thereon, a pair of facing ratchets upon the frame, a pair of pawls engageable therewith and freed therefrom by bodily movement of the master keyboard and a common rotatable support for said pawls.

GEORGE H. THOMAS.

Witnesses:
HELEN I. KAUFFMAN,
WM. STEELL JACKSON.

Copies of this patent may be obtained for five cents each, by addressing the "Commissioner of Patents, Washington, D. C."